Nov. 17, 1925.

D. R. BOWEN ET AL 1,561,903

MACHINE FOR TREATING RUBBER OR OTHER PLASTIC MATERIAL

Original Filed July 11, 1919    3 Sheets-Sheet 1

Inventor

D. R. Bowen & C. F. Schnuck,

By

Attorney

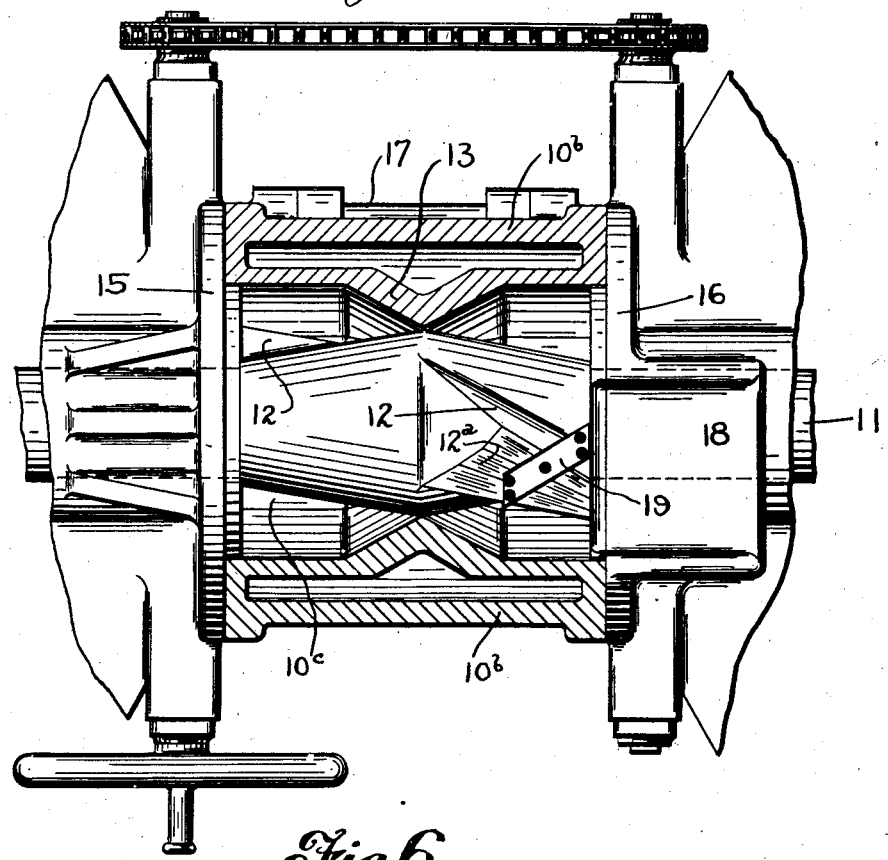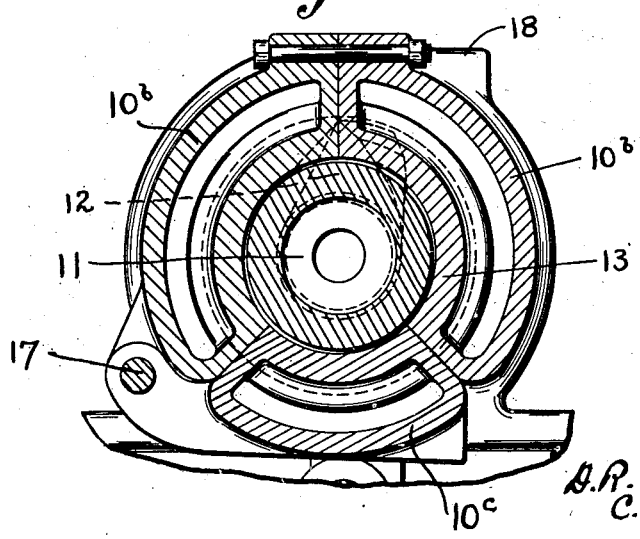

Patented Nov. 17, 1925.

1,561,903

UNITED STATES PATENT OFFICE.

DAVID R. BOWEN, OF ANSONIA, AND CARL F. SCHNUCK, OF NEW HAVEN, CONNECTICUT, ASSIGNORS TO FARREL FOUNDRY & MACHINE COMPANY, OF ANSONIA, CONNECTICUT, A CORPORATION OF CONNECTICUT.

MACHINE FOR TREATING RUBBER OR OTHER PLASTIC MATERIAL.

Original application filed July 11, 1919, Serial No. 310,020. Divided and this application filed February 10, 1922. Serial No. 535,651.

*To all whom it may concern:*

Be it known that we, DAVID R. BOWEN and CARL F. SCHNUCK, both citizens of the United States, the first residing in Ansonia, county of New Haven, State of Connecticut, and the second residing in New Haven, county of New Haven, State of Connecticut, have invented certain new and useful Improvements in Machines for Treating Rubber or Other Plastic Material, of which the following is a full, clear, and exact description.

This invention relates to machines for mixing or masticating rubber and like material, and it has particular reference to machines of the type described in our application Serial No. 310,020, filed July 11, 1919, now Patent #1,420,959, of which the present application is a division.

One of the primary objects of the present invention is to provide a machine in which a bladed rotor has an especially efficient and thorough mixing, masticating, or kneading action on the material, and wherein, nevertheless, the mixing or working chamber can be very readily charged and discharged.

Another object is to furnish a machine suitable for the compounding of rubber and like material in which a single bladed rotor is enclosed by a substantially circumferentially continuous hollow cylinder constituting the working chamber, such cylinder being closed substantially throughout its length during the mixing or masticating operation so as to confine the rotor on all sides and thereby increase the masticating effect; and in which it is possible to introduce into the cylinder material to be mixed or otherwise treated without interfering in any way with the efficient mixing action of the machine.

To these and other ends, the invention consists in the novel features and combinations of parts to be hereinafter described and claimed.

In the accompanying drawings,

Fig. 5 is an enlarged top plan view partly in horizontal section; and

Fig. 6 is a central transverse section of the working chamber and rotor with the door operating mechanism omitted.

Figure 1:
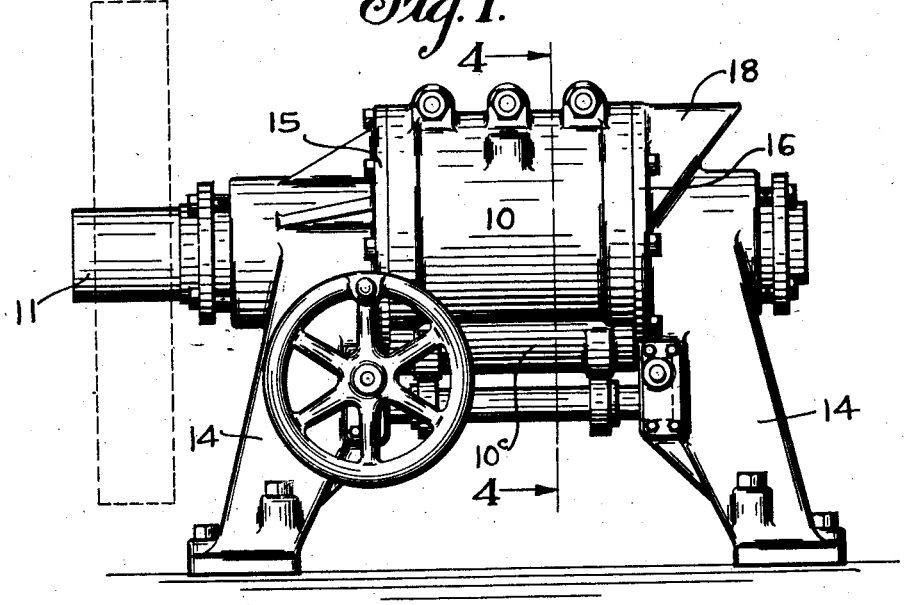
Fig. 1 is a front elevation of a masticator embodying our improvements.
Figure 2:
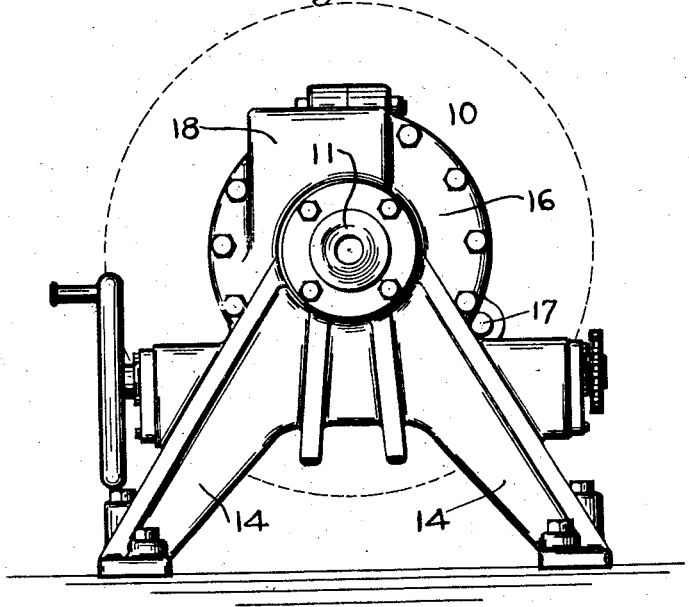
Fig. 2 is an end elevation of the same.
Figure 3:
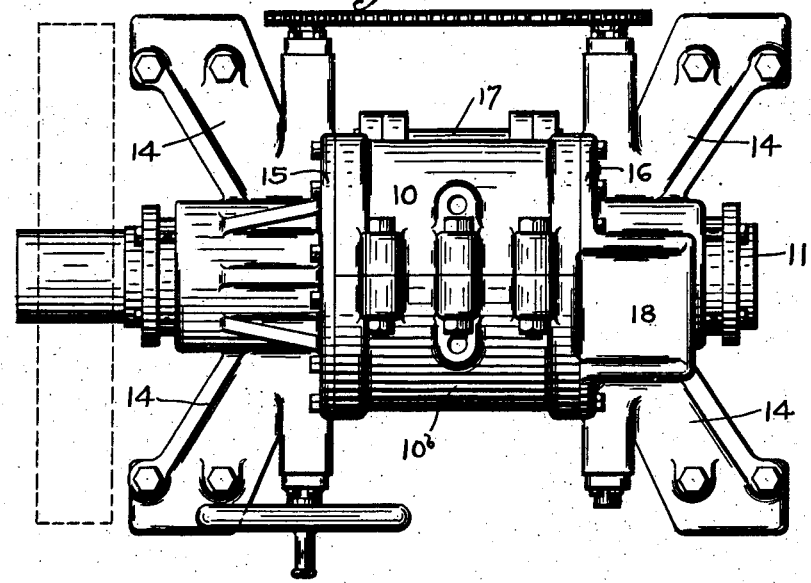
Fig. 3 is a top plan view.
Figure 4:
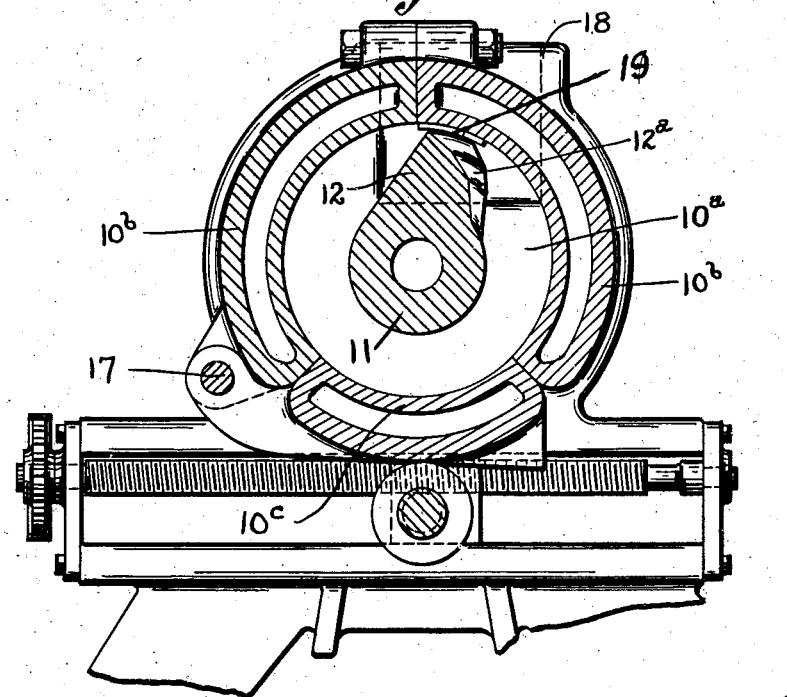
Fig. 4 is an enlarged section on line 4—4 of Fig. 1.

The machine selected for illustration comprises a casing 10 in the form of a hollow cylinder, the axis of which is horizontally arranged and within which is a hollow cylindrical working chamber 10ª. Journalled in the working chamber is a horizontal shaft 11 having blades 12 operating in the respective end portions of the chamber. In the form shown, there is only one blade in each chamber end. These blades have faces 12ª which mash or smear the material against the transversely curved inner periphery of the chamber by a sort of wedging action; and blades in the respective chamber ends are arranged on the shaft at such angles as to work portions of the material from the chamber extremities toward the center while simultaneously shifting the material around the periphery of the chamber. One of the blades works the material from one end portion of the chamber into the other, wherein it is taken up by the other blade and returned to the first named end portion of the chamber. Thus the material is worked back and forth in the chamber in a generally longitudinal direction, while having a rotary motion about the chamber periphery. At the intermediate portion of the chamber the same is constricted by providing on the inner chamber wall, the interiorly projecting transverse rib 13 to which the rotor hubs and the blades conform so as to obtain, in addition to the mashing or smearing action, an extrusion of the rubber or other material alternately in opposite directions through the constricted opening thus provided, as described in our Patent No. 1,379,616, of May 13, 1921.

The rotor shaft can be driven by power in any suitable manner. The bearings for this shaft are provided on the cylinder heads which close the cylinder at the ends; and these cylinder heads are preferably made integral with the legs 14 by means of which the casing is supported above the floor. The casing 10 is preferably made up of a plurality of curved sections interposed between and secured to the cylinder heads which are designated by 15 and 16, respectively. The curved casing sections constituting the side wall of the mixing cylinder may comprise two fixed sections 10$^b$ meeting each other at the top of the casing and a movable discharge section 10$^c$ at the lower part of the chamber. The discharge section 10$^c$ is of the swinging type being pivoted at 17 and forming, in effect, a swingable curved wall section of the casing at the lower portion thereof.

When the chamber is to be discharged, the discharge section 10$^c$ which is controlled by suitable closing and locking mechanism, fully described in the parent application, is permitted to swing down by gravity into the open position about the axis of the pivot member 17.

In the embodiment selected for illustration, the charging opening is located in the head 16. It is formed adjacent the bottom of a charging hopper 18 which is preferably integral with the head 16. The hopper has an inclined bottom, and its inner side is open so that material sliding down on the hopper bottom may pass freely by gravity into the end portion of the working cylinder. For facilitating the drawing in of the material from the hopper by means of the rotor, one or more small projecting members 19 may be applied to the inner surface of the cylindrical chamber wall as described in our application Serial No. 310,020 now Patent #1,420,959.

The operation of the machine will be obvious from the foregoing description. It will be observed that substantially throughout its length the bladed rotor is confined on all sides by the transversely curved and substantially transversely continuous wall of the working chamber, so that the rotor has a very effective masticating or mixing action on the material throughout the chamber periphery. This considerably increases the efficiency of the machine as compared to those of the duplex type found on the market, wherein only partially cylindrical chambers are arranged side by side with an open communicating space where the material is subjected to very little, if any, kneading action against the chamber wall. In our machine the chamber is entirely closed at its middle portion during the mixing operation and is closed, moreover, substantially throughout its length. The batch of material is introduced into the end portion of the chamber without interfering with the mashing or smearing of the material against substantially the entire area of the inner curved surface of the chamber. In the particular example illustrated, the material is introduced through the end wall of the chamber, but this is not necessary in all cases as other provisions for charging may be made without sacrificing any considerable area of the curved mixing surface of the chamber wall which encloses and thereby cooperates with the bladed rotor. We believe that a considerably improved mixing effect can be obtained with an elongated single working cylinder provided with a substantially continuous circumference and with an end charging opening through which the materials to be mixed move by gravity directly into the chamber, as described. When closed, the cylinder presents a circumferentially extending cross-section at its middle portion and substantially throughout its length so as to provide a surface of large area against which the rotor works the material back and forth in a generally longitudinal direction while the material is simultaneously moved around the circumference of the cylinder. When it is desired to discharge the machine, however, the swingable wall section 10$^c$ may be readily dropped to the discharging position as described in the prior application. The gravity feed member on the end of the cylinder provides for the charging by gravity of the entire mass of material to be treated which, where the machine is used as a rubber compounding machine, consists of chunks of rubber, powder, coloring or filling material, and the like. It will be obvious that, in our improved machine, it is possible, after the initiation of the mixing of the rubber chunks with powder, filler or the like, to introduce additional powder or additional rubber or both, into the mixing cylinder at the end thereof without interrupting the operation of the machine.

Various changes may be made in the details of the construction without departing from the scope of our invention as set forth in the claims.

We consider it advantageous to reduce the diameter of the working chamber at its middle portion, as described, for the purpose of producing an extrusion action, but it will be obvious that in certain cases the extrusion rib or its equivalent may be omitted; and so far as the present invention is concerned, the projection 19 or its equivalent for facilitating the inward movement of the material from the hopper may also be omitted without sacrificing the advantages of the invention.

We do not claim broadly herein the method of mixing or masticating rubber or like material by an extrusion action, as claimed in our application Serial No. 223,537 now Patent #1,460,938; nor do we claim broadly herein a masticator having a continuous annular extrusion rib cooperating with a bladed rotor as claimed in our application Serial No. 341,141 now Patent #1,496,620; nor do we claim herein, broadly, the method of mixing or masticating rubber or similar material, which comprises working the same around and back and forth against a substantially circumferentially continuous cylindrical mixing surface of substantial area, as claimed in our application Serial No. 458,222; nor do we claim herein the combination, in a machine of the character described, of a working chamber, pedestals supporting said chamber, said pedestals being provided with extensions forming the ends of said chamber, and hinged sections supported between said ends and forming the sides of said chamber, as claimed in our application Serial No. 423,365 now Patent #1,530,808.

What we claim is:

1. A rubber working or similar machine having a working chamber consisting of an elongated single cylinder provided with a substantially continuous circumference and with an end charging opening through which the materials to be mixed move by gravity directly into the chamber, and means for working the material back and forth therein.

2. A rubber working machine having a chamber consisting of an elongated single cylinder provided with a substantially continuous circumference and with an end gravity-feed hopper for the entire charge to be mixed, leading directly into the cylinder, and a bladed rotor in the cylinder for working the material back and forth therein, said cylinder having a shiftable wall section providing for the discharge of the treated material.

3. The method of mixing rubber chunks with powdered filler or the like, which comprises working the preliminary mixture against a substantially circumferentially continuous cylindrical mixing surface so that the mass moves around such surface while having at the same time a movement generally longitudinally thereof in opposite directions, and introducing additional rubber and powder from one end of the cylinder.

4. A rubber mixer having a chamber consisting of a single cylinder closed at its middle portion but provided with an end gravity-feed opening for rubber and powder, leading directly into the cylinder, and a bladed rotor for working the material back and forth against the chamber wall.

5. A rubber mixer having a chamber consisting of a single elongated cylinder, having a substantially continuous circumference, and provided with a gravity-feed hopper at the end thereof through which the materials to be mixed move by gravity into said cylinder, and a bladed rotor for working the material back and forth against the chamber wall.

6. A rubber mixing machine having a chamber consisting of an elongated cylinder having a closed substantially circumferentially extending middle portion, a rotor for moving the material back and forth in the cylinder, and a hopper providing for the charging of the entire mass of material to be treated, directly into the chamber by gravity at the end portion thereof, and means providing for the discharge of the cylinder at its lower part.

7. A rubber mixer or like machine having a working chamber consisting of a single cylinder presenting a closed circumferentially extending cross-section at its middle portion and substantially throughout its length, a rotor for working the material back and forth in the cylinder against the inner surface of its cylindrical wall, a gravity-feed hopper on the end of the cylinder leading directly into the cylinder and providing for the charging by gravity of the entire mass of material to be treated, into said cylinder, said cylinder having a swingable wall section providing for the discharge thereof at its lower part.

8. A rubber mixer or like machine having a working chamber in the form of a circumferentially continuous elongated cylinder closed substantially throughout the length thereof, a bladed rotor in said cylinder for working the material back and forth therein while smearing it against and moving it around the inner surface of the cylindrical wall, and a charging hopper providing for the charging of the entire mass of material to be treated, into the chamber at the end portion thereof, said cylinder having a hinged wall section providing for the discharge thereof at the lower part of the cylinder.

9. A rubber working or similar machine having a working chamber provided with a transversely curved and transversely continuous inner surface throughout substantially its entire length, means for providing for the charging of the material into said chamber at the end portion thereof, and a bladed rotor in said working chamber for working the material back and forth therein and around the curved wall thereof.

10. A rubber working or similar machine having a working chamber provided with a transversely curved and transversely continuous inner surface at the middle portion thereof, means providing for the charging of the entire batch of material to be treated into said chamber at the end thereof, and a bladed rotor in said chamber for working the material back and forth therein, said rotor being confined by said chamber throughout the path of rotation of the rotor blades.

11. A rubber working or similar machine having a working chamber provided with a transversely curved and transversely continuous inner surface at the middle portion thereof and at the ends, means providing for the charging of the entire batch of material to be treated into the chamber at the end portion thereof, and a bladed rotor in said chamber for working the material from the ends thereof toward the center and simultaneously shifting such material around the entire inner periphery of the chamber while maintaining it in contact therewith.

In witness whereof, we have hereunto set our hands on the 8th day of February 1922.

DAVID R. BOWEN.
CARL F. SCHNUCK.